United States Patent
Bois et al.

(10) Patent No.: US 8,925,688 B2
(45) Date of Patent: Jan. 6, 2015

(54) LUBRICATION NOZZLE AND ASSOCIATED MOUNTING METHOD

(71) Applicants: Thierry Bois, Saumur (FR); Regis Page, Bagneux (FR); Kilian Tisserand, Allones (FR)

(72) Inventors: Thierry Bois, Saumur (FR); Regis Page, Bagneux (FR); Kilian Tisserand, Allones (FR)

(73) Assignee: Aktiebolaget SKF, Gothenburg (SE)

( * ) Notice: Subject to any disclaimer, the term of this patent is extended or adjusted under 35 U.S.C. 154(b) by 17 days.

(21) Appl. No.: 13/771,681

(22) Filed: Feb. 20, 2013

(65) Prior Publication Data

US 2013/0221133 A1  Aug. 29, 2013

(30) Foreign Application Priority Data

Feb. 27, 2012  (FR) ..................................... 12 51759

(51) Int. Cl.
*F16N 5/02* (2006.01)
*B05B 1/14* (2006.01)
*B05B 1/30* (2006.01)
*B05B 15/08* (2006.01)
*B65G 45/08* (2006.01)
*B05B 15/06* (2006.01)

(52) U.S. Cl.
CPC ... *F16N 5/02* (2013.01); *B05B 1/14* (2013.01); *B05B 1/3006* (2013.01); *B05B 15/08* (2013.01); *B65G 45/08* (2013.01); B05B 15/065 (2013.01)
USPC ........................................................ 184/100

(58) Field of Classification Search
CPC .... B05B 15/08; B05B 15/061; B05B 15/067; B05B 7/1495
USPC .............................. 184/100; 239/536; 29/428
See application file for complete search history.

(56) References Cited

U.S. PATENT DOCUMENTS

| | | | | |
|---|---|---|---|---|
| 1,881,345 A | * | 10/1932 | Beatty et al. ................... | 239/422 |
| 2,342,757 A | * | 2/1944 | Roser ............................. | 239/536 |
| 2,370,408 A | * | 2/1945 | MacDonald .................... | 239/422 |
| 2,483,730 A | * | 10/1949 | Huff, Jr. et al. ............... | 239/536 |
| 2,492,526 A | * | 12/1949 | Geibig ........................... | 239/273 |
| 2,501,839 A | * | 3/1950 | Blair et al. ..................... | 428/87 |
| 2,574,874 A | * | 11/1951 | Koeppel ........................ | 239/247 |
| 2,683,626 A | * | 7/1954 | Wahlin .......................... | 239/536 |
| 2,995,173 A | * | 8/1961 | Nawalanic ...................... | 239/73 |
| 3,840,179 A | * | 10/1974 | Krohn et al. ...................... | 239/1 |
| 4,842,195 A | * | 6/1989 | Koll et al. ......................... | 239/1 |
| 5,226,506 A | * | 7/1993 | Link ............................. | 184/6.26 |
| 5,248,094 A | * | 9/1993 | Munoz .......................... | 239/247 |
| 6,374,948 B1 | | 4/2002 | Stack et al. | |
| 7,040,546 B2 | * | 5/2006 | Horan et al. ...................... | 239/1 |
| 8,381,667 B2 | * | 2/2013 | Gibowski ...................... | 110/238 |
| 2010/0206965 A1 | * | 8/2010 | Gibowski .................... | 239/587.5 |

FOREIGN PATENT DOCUMENTS

| | | |
|---|---|---|
| DE | 10006283 A1 | 8/2001 |
| DE | 102009051542 A1 | 5/2011 |
| DE | 202011101244 U1 | 8/2011 |
| EP | 0894535 A1 | 2/1999 |
| EP | 1240949 A2 | 9/2002 |
| FR | 1082441 A | 12/1954 |

* cited by examiner

*Primary Examiner* — William A Rivera
*Assistant Examiner* — Michael Riegelman
(74) *Attorney, Agent, or Firm* — Bryan Peckjian; SKF USA Inc. Patent Department

(57) ABSTRACT

The lubrication nozzle comprises a nozzle body provided with a lubricant supply channel, and at least two spray heads each comprising an outlet orifice in communication with the supply channel. The nozzle also comprises at least one adjustment means on which a first one of the spray heads is placed so as to modify the spacing between the outlet orifices of the said spray heads when there is an eccentric rotation.

14 Claims, 3 Drawing Sheets

LUBRICATION NOZZLE AND ASSOCIATED MOUNTING METHOD

This application claims priority to French Patent Application No. FR1251759 filed on Feb. 27, 2012, the contents of which are fully incorporated herein by reference.

FIELD OF THE INVENTION

The present invention relates to a nozzle that can spray lubricant on elements in motion, in particular conveyer chains used in industry.

BACKGROUND OF THE INVENTION

Conventionally, such spray nozzles comprise a nozzle body connected to a lubricant supply circuit. The nozzle body is provided with at least one delivery or spray gun or head provided with an outlet orifice through which the lubricant is ejected.

In certain industrial applications and in particular for conveyer chains, it is necessary to provide lubrication in several zones that are brought closer to one another.

For this purpose, it is known practices to use nozzles comprising a single spray head and to arrange them to spray the lubricant on each of the zones to be lubricated. For more details, it is possible for example to refer to documents DE-A1-100 06 283 and U.S. Pat. No. 6,374,948.

However, with such a solution, in the case of zones to be lubricated that are relatively close, the overall bulk of the arrangement of nozzles becomes too great because it is necessary to mount the nozzles in a manner offset relative to one another. Moreover, it is necessary to mount as many nozzles as there are zones to be lubricated.

In order to remedy these drawbacks, nozzles have been proposed with double spray heads each head comprising an outlet orifice through which the lubricant is ejected. However, the spacing between the outlet orifices of a nozzle may be greater than the distance that exists between two zones to be lubricated.

In this case, the nozzle must be mounted in an inclined manner so that the plane passing through the outlet orifices forms a non-zero angle with the plane passing through the two zones to be lubricated. However, the distance between the outlet orifice and the associated zone to be lubricated is different from one spray head to another. This can cause poor lubrication.

The object of the present invention is to remedy this drawback.

SUMMARY OF THE INVENTION

More particularly, the object of the present invention is to provide a spray nozzle capable of providing an optimized lubrication even when there is a reduced distance between several zones to be treated.

The object of the present invention is also to provide a spray nozzle that is compact, economical and easy to assemble.

In one embodiment, the lubrication nozzle comprises a nozzle body provided with a lubricant supply channel, at least two spray heads each comprising an outlet orifice in communication with the supply channel, and at least one adjustment means on which one of the spray heads is placed so as to modify the spacing between the outlet orifices of the said spray heads when there is an eccentric rotation.

The other spray head may be fixed relative to the nozzle body.

In a preferred embodiment, the adjustment means comprises an eccentric that can move angularly relative to the nozzle body.

In one embodiment, the nozzle body comprises a receiving bore inside which the eccentric is mounted. Preferably, the other spray head is carried by the nozzle body.

In another embodiment, the nozzle body comprises an eccentric support mounted fixedly inside a housing of the said body and comprising a receiving bore inside which the said eccentric is mounted. Preferably, the other spray head is carried by the eccentric support.

The outer surface of the eccentric may comprise a thread interacting with a matching thread of the bore for receiving the eccentric support. In order to limit the axial movement of the eccentric, it is possible to provide a seal mounted in the bore for receiving the eccentric and capable of interacting by interference with a shoulder of the outer surface of the eccentric.

Advantageously, the nozzle comprises means for locking the rotation of the eccentric.

Preferably, the eccentric comprises a hollow recess capable of receiving an operating key, for the adjustment of the angular position of the said eccentric.

In one embodiment, the nozzle also comprises a valve capable of sliding under the effect of the pressure applied by the lubricant and a spring applying a return force on the said valve, the valve and the spring being mounted inside the supply channel.

The invention also relates to a lubricating system comprising a plurality of nozzles as defined above.

The invention also relates to a method for mounting a lubrication nozzle comprising a nozzle body provided with a lubricant supply channel, at least two spray heads each comprising an outlet orifice in communication with the supply channel, and at least one adjustment means on which one of the spray heads is placed, in which the position of the adjustment means is adjusted relative to the nozzle body in order to adapt the spacing between the outlet orifices of the spray heads as a function of the distance apart between the zones to be lubricated, and in which the adjustment means is locked relative to the nozzle body after adjustment.

Preferably, the mounting method comprises a step of adjusting the position of the nozzle so the plane passing through the outlet orifices of the spray heads forms a zero angle with the plane passing through the associated two zones to be lubricated.

BRIEF DESCRIPTION OF THE DRAWINGS

The present invention will be better understood on studying the detailed description of an embodiment taken as a non-limiting example and illustrated by the appended drawings, in which.

DETAILED DESCRIPTION OF THE INVENTION

Figure 1:
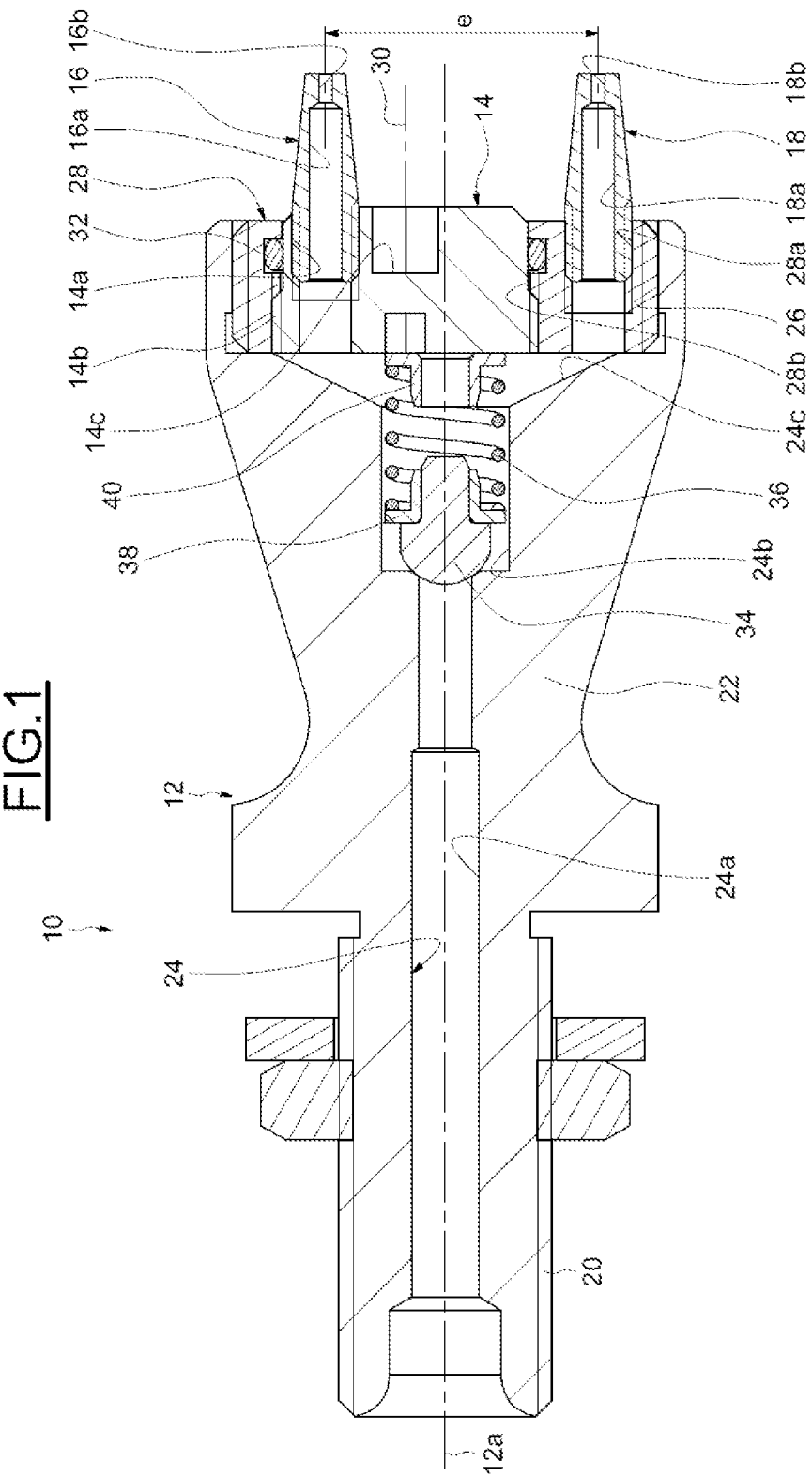
FIGS. 1 and 2 are views in axial section of a lubrication nozzle according to one example of the invention.

In FIG. 1, a lubrication nozzle, referenced 10 in its entirety, comprises a nozzle body 12, an adjustment means in this instance comprising an eccentric 14 (referred to as "insert" in the claims) mounted on the nozzle body 12 while being able to move angularly relative to the said body, a first spray head 16 mounted on the eccentric and a second spray head 18 fixed relative to the nozzle body. As will be described in detail below, the relative position of the spray heads 16, 18 may be adjusted as a function of the distance that exists between two zones to be lubricated.

The nozzle body 12 extends along a longitudinal axis 12a and comprises a cylindrical base portion 20 which is extended axially by a head portion 22 allowing the mounting of the eccentric 14 and of the spray heads 16, 18. The nozzle body 12 comprises a supply channel 24 extending axially from a front end surface of the base portion 20 to the head portion 22. Axially on the side of the base portion 20, the supply channel 24 allows the connection of a circuit for the delivery of the lubricant (not shown) comprising notably a circulation pump. The supply channel 24 comprises a staged cylindrical portion 24a of small diameter extending from the front end surface of the base portion 20 and which is extended axially, at the head portion 22, by a cylindrical portion 24b of large diameter, itself extended axially by a conical portion 24c tapering to the outside. The head portion 22 comprises, at one front end surface, a cylindrical opening or housing 26 inside which the conical portion 24c of the supply channel emerges.

The nozzle 10 also comprises an eccentric support 28 (referred to as "insert support" in the claims) mounted inside the housing 26 of the nozzle body while resting axially against the said body. The support 28 is fixed in the housing 26 by any appropriate means, for example by screwing, bonding or welding.

The eccentric support 28 of generally cylindrical shape is provided with an axial through-cavity 28a inside which the spray head 18 is fixedly mounted and with a receiving bore 28b, with an axis 30 which is offset radially outwards relative to the axis 12a of the nozzle body. The cavity 28a emerges at the conical portion 24c of the supply channel in order to allow fluidic communication between the said channel and the spray head 18. The spray head 18 comprises an axial delivery channel 18a which communicates with the supply channel 24 and which emerges at an outlet orifice 18b. The spray head 18 protrudes axially relative to the support 28 and to the nozzle body 12.

The eccentric 14 is mounted inside the bore 28b for receiving the eccentric support while being centred on the axis 30. The eccentric 14 can turn about the axis 30 relative to the support 28 and to the nozzle body 12. The eccentric 14 comprises a through axial recess 14a inside which the spray head 16 is fixedly mounted. The recess 14a emerges at the conical portion 24c of the supply channel in order to allow fluidic communication between the said channel and the spray head 16. The spray head 18 is identical to the other head 16 and protrudes axially relative to the eccentric 14 and to the nozzle body 12. The delivery channel 16a of the spray head 16 communicates with the supply channel 24 and emerges at the outlet orifice 16b. The radial spacing or centre-to-centre distance that exists between the two orifices 16b, 18b of the spray heads is marked e in FIG. 1.

In the embodiment illustrated, the cavities 28a of the support and 14a of the eccentric each comprise a threaded portion in order to allow the fixing of the associated spray head 18, 16. Alternatively, the spray heads 18, 16 can be fixed by any other appropriate means, for example by screwing or bonding or welding. In another embodiment, each spray head 16, 18 and its associated support, i.e. the eccentric 14 or the eccentric support 28, can be made in a single piece, for example by moulding of a synthetic material.

The outer surface of the eccentric 14 comprises a shoulder 14b provided with a thread engaged with a matching thread provided in the bore 28b for receiving the eccentric support.

A hollow recess 14c is arranged on the front end surface of the eccentric oriented axially outwards. The recess 14c is centred on the axis 30 and designed to receive an operating key (not shown) in order to be able to adjust the angular position on the eccentric 14 relative to the eccentric support 28, and more generally relative to the nozzle body 12. In the embodiment illustrated, the recess 14b is of hexagonal shape so as to receive a hexagonal socket key.

The nozzle 10 also comprises an opening/closing valve 34 mounted inside the cylindrical portion 24b of large diameter of the supply channel, and a spring 36 capable of applying a permanent axial return force on the valve so that it presses against the radial wall connecting the cylindrical portion 24b of large diameter and the cylindrical portion 24a of the supply channel, and thus closes off the said channel. The valve 34 in this instance has the shape of a mushroom and is mounted inside a supporting cup 38 that is L-shaped in cross section. Another cup 40 of identical design is fixed to the eccentric 14 at the front end surface that is axially opposite to that on which the recess 14c is formed. A first end of the spring 36 presses against the cup 40, the other end of the spring pressing axially against the cup 38 so that the valve 34 closes off the cylindrical portion 24a of the supply channel when no lubricant is travelling inside the said supply channel. Under the effect of the pressure applied by the lubricant conveyed inside the cylindrical portion 24a of the supply channel, the valve 34 can slide axially towards the eccentric 14 in order to allow the circulation of the lubricant and the supply of the spray heads 16, 18.

Figure 2:
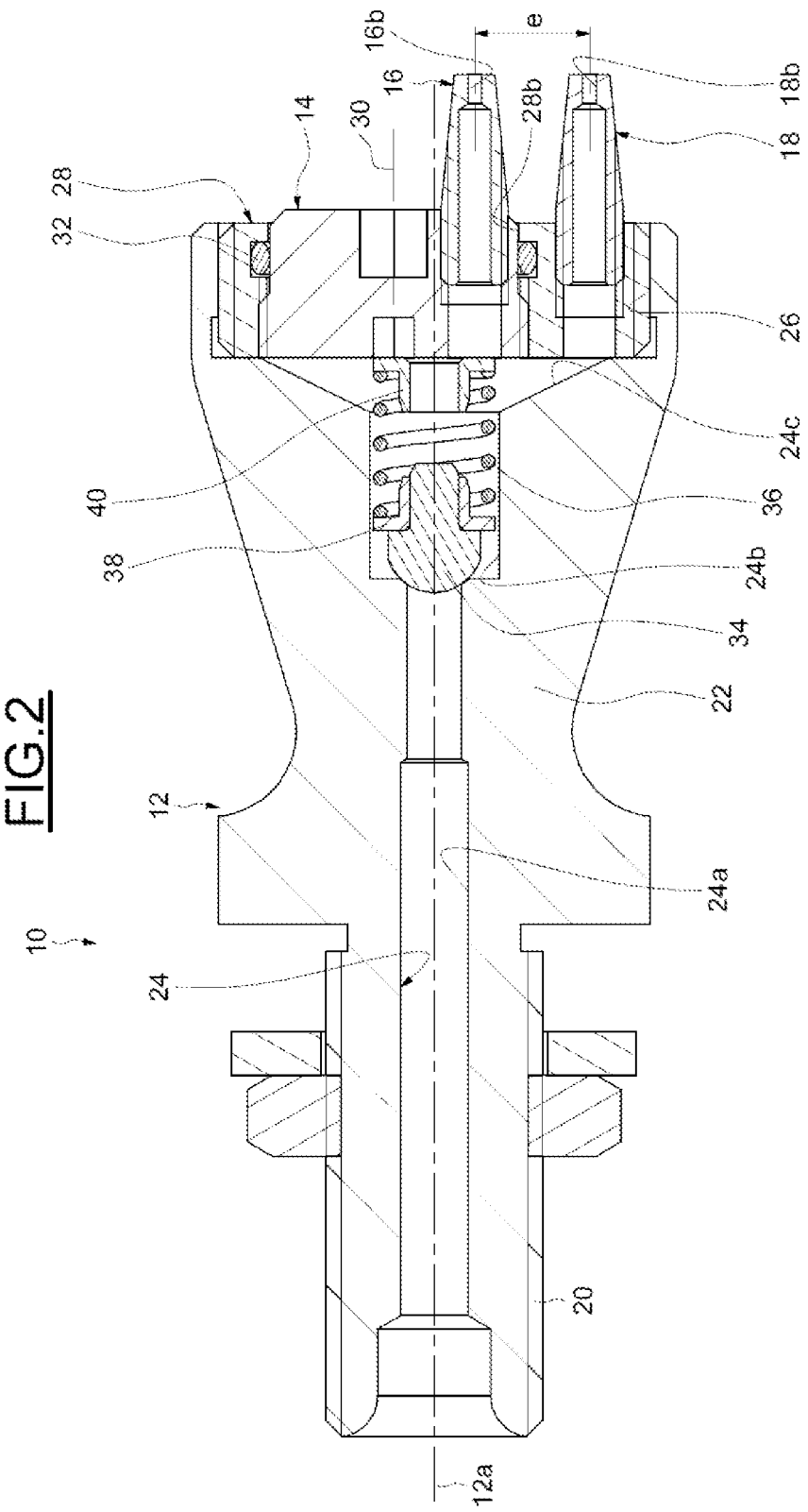
Figure 3:
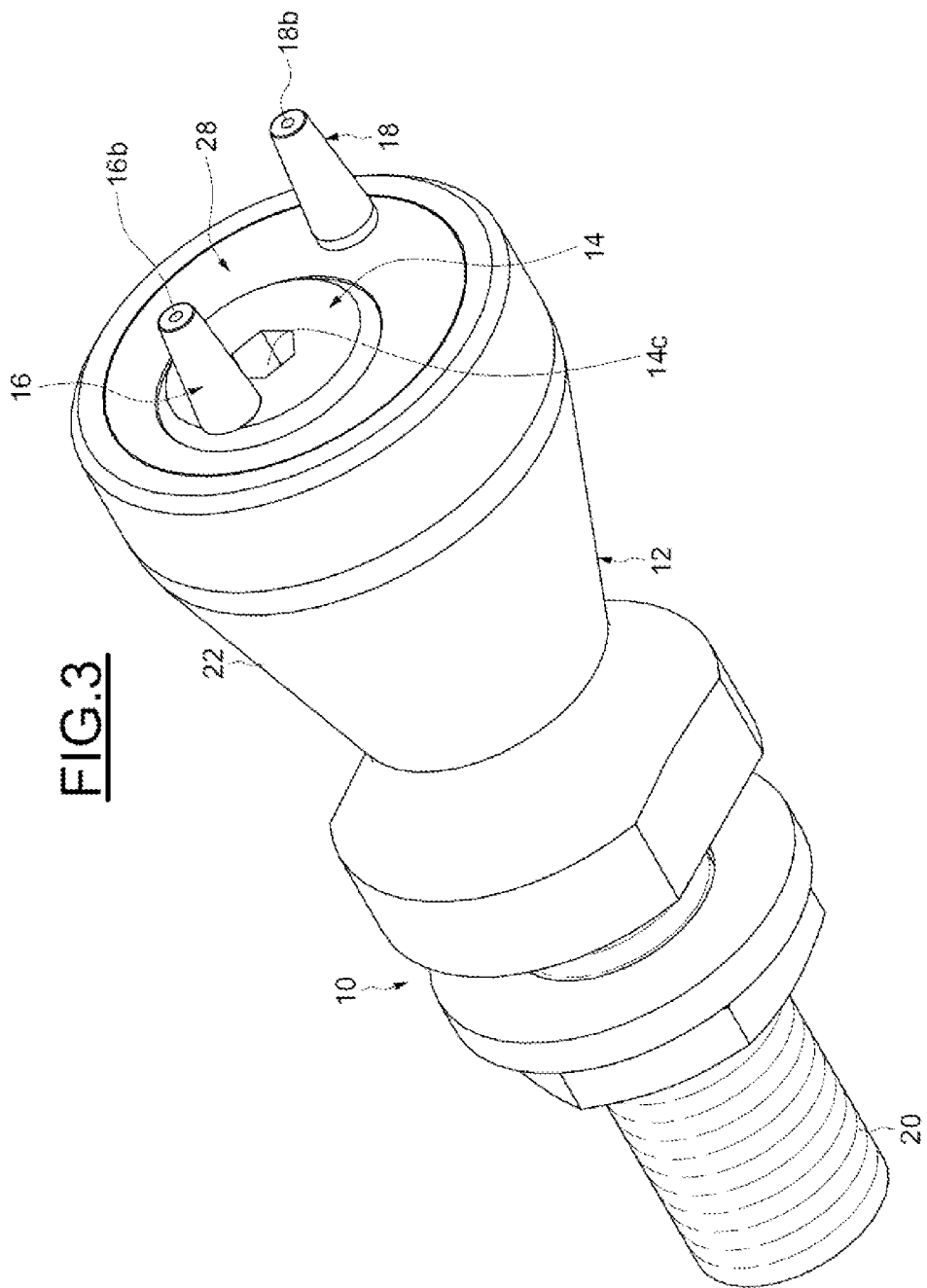
FIG. 3 is a view in perspective of the nozzle in the position of FIG. 1.

In order to adjust the distance between the spray heads 16, 18 of the nozzle, the procedure is as follows. The operating key is inserted into the recess 14c of the eccentric in order to rotate the said eccentric about the axis 30 in order to adjust its angular position inside the bore 28b for receiving the eccentric support. The angular position of the eccentric 14 is adjusted according to the centre-to-centre distance e that is desired between the outlet orifices 16b and 18b of the spray heads, which centre-to-centre distance is determined depending on the distance between the two zones to be lubricated. In FIG. 1, the spray heads 16, 18 are placed in one and the same radial plane in the maximum centre-to-centre position whereas they are in the minimum centre-to-centre position in FIG. 2.

After adjustment of the angular position of the eccentric 14 supporting the spray head 18, the thread of the outer surface of the said eccentric and the matching thread of the bore 28b for receiving the eccentric support allow the rotation of the eccentric to be locked and the retention of the chosen angular position.

When the angular position of the eccentric 14 is adjusted, there is a slight axial movement of the said eccentric relative to the support 28. The outlet orifice 16b of the spray head supported by the eccentric 14 can then be slightly offset forwards relative to the outlet orifice 18b of the fixed spray head 18. Such an axial movement of the eccentric 14 is however limited to a few millimeters and does not cause a problem in the quality of lubrication obtained.

In order to limit the axial movement of the eccentric 14, an O-ring seal 32 is mounted in an annular groove arranged in the bore 28b for receiving the eccentric support. The seal 32 is capable of interacting by radial interference with the shoulder 14c of the eccentric when there is axial movement of the said eccentric. Moreover, the seal 32 makes it possible, by radial friction contact with the outer surface of the eccentric 14, to participate in locking the rotation of the said eccentric 14 after adjustment of the angular position.

In the exemplary embodiment illustrated, the eccentric 14 comprises a thread interacting with a thread of the eccentric support 28. As a variant, the outer surface of the eccentric and the bore 28*b* for receiving the eccentric support may be smooth. In this case, a means for angular locking may be provided that is outside the eccentric 14, for example a screw passing radially through the thickness of the nozzle body 12 and of the eccentric support 28 in order to be able to interact by friction with the outer surface of the eccentric. Alternatively, the rotation of the eccentric can be locked after adjustment by bonding or welding on the eccentric support. Such rotational locking means could equally be supplied with the eccentric 14 provided with the thread on its outer surface as described above.

In all the envisaged embodiments, the eccentric 14 is mounted on an eccentric support 28 fixed to the nozzle body 12. Alternatively, it could be possible to provide no intermediate eccentric support and to mount the eccentric directly in the nozzle body 12 with the possibility of angular movement.

Moreover, it is equally possible to provide a lubrication nozzle comprising a greater number of spray heads. It is for example possible to provide a nozzle with three spray heads comprising one spray head that is fixed relative to the nozzle body and two heads that can move angularly relative to the said body by each being mounted on a specific eccentric. In another variant, it would also be possible to provide a nozzle in which each spray head is mounted on an eccentric that can move angularly relative to the nozzle body.

By virtue of the invention, a nozzle for spraying a lubricant is obtained in which the centre-to-centre distance between the outlet orifices of the spray heads can be easily adjusted as a function of the distance between the zones to be lubricated. This promotes the achievement of a good lubrication by spraying the lubricant exactly on the zones to be treated. The nozzle may also be used in zones where space is restricted. This provides a nozzle that can be used to lubricate zones that are closer or further apart. Moreover, during a possible maintenance operation, it is possible to change the faulty element, for example a clogged spray head, while retaining the other elements forming the nozzle. The elements forming the nozzle can be made of stainless steel, of aluminium or else of synthetic material.

The invention claimed is:

1. A lubrication nozzle comprising:
   a nozzle body provided with a lubricant supply channel,
   a first axis positioned axially along a radial center of the nozzle body, the nozzle body having a side facing in a direction in which lubricant is to be sprayed;
   a first spray nozzle being movably located on the nozzle body while being maintained and fixed in an orientation parallel to a second axis, the second axis being spaced from and parallel to the first axis, motion of the first spray nozzle about the second axis not resulting in the first spray nozzle being aligned askew with the second axis,
   a second spray nozzle located on the nozzle body and fixed in an orientation parallel to the first axis such that the second spray nozzle cannot be positioned askew relative to the first axis, the first spray nozzle and the second spray nozzle both extending from the side of the nozzle body, wherein rotation of the first spray nozzle about the second axis results in a distance between a first outlet orifice of the first spray nozzle and a second outlet orifice of the second spray nozzle being adjusted.

2. The lubrication nozzle according to claim 1, wherein the nozzle body further comprises an insert positioned therein that is rotatable about the second axis, the first spray nozzle being located on the insert, rotation of the insert about the second axis resulting in the first spray nozzle rotating about the second axis and adjusting the distance between the first outlet orifice of the first spray nozzle and the second outlet orifice of the second spray nozzle.

3. The nozzle according to claim 2, wherein the insert can be secured in position relative to the second axis during normal operation of the lubrication nozzle.

4. The nozzle according to claim 3, wherein the nozzle body further comprises a housing, the insert being rotatably positioned in the housing.

5. The nozzle according to claim 4, wherein the nozzle body further comprises an insert support located in the housing, the insert being positioned in the insert support, the second spray head being located on the insert support.

6. The nozzle according to claim 5, wherein an outer surface of the insert further comprises a thread interacting with a matching thread in a bore defined by the insert support.

7. The nozzle according to claim 6, further comprising a seal mounted in the bore of the insert support and capable of interacting by interference with a shoulder of the outer surface of the insert to limit axial movement of the insert.

8. The nozzle according to claim 3, wherein the insert further comprises a hollow to receive an operating key for the adjustment of an angular position of the said eccentric.

9. The nozzle according to claim 6, wherein the rotational position of the insert is fixed during use of the lubrication nozzle by contact between the thread of the insert and the matching thread of the insert support.

10. The nozzle according to claim 1, further comprising a valve mounted inside the lubricant supply channel and biased to close the lubricant supply channel by a spring positioned thereagainst, lubricant traversing the spray nozzle toward the first spray nozzle and the second spray nozzle being capable of overcoming a force of the spring and moving the valve such that the lubricant supply channel is open.

11. A lubrication system comprising:
    a plurality of nozzles, each one of the plurality having:
    a nozzle body provided with a lubricant supply channel, a first axis positioned axially along a radial center of the nozzle body, the nozzle body having a side facing in a direction in which lubricant is to be sprayed;
    a first spray nozzle being movably located on the nozzle body while being maintained and fixed in an orientation parallel to a second axis, the second axis being spaced from and parallel to the first axis, motion of the first spray nozzle about the second axis not resulting in the first spray nozzle being aligned askew with the second axis,
    a second spray nozzle located on the nozzle body and fixed in an orientation parallel to the first axis such that the second spray nozzle cannot be positioned askew relative to the first axis, the first spray nozzle and the second spray nozzle both extending from the side of the nozzle body, wherein rotation of the first spray nozzle about the second axis results in a distance between a first outlet orifice of the first spray nozzle and a second outlet orifice of the second spray nozzle being adjusted.

12. A method for mounting a lubrication nozzle comprising:
    providing a nozzle body, a first axis positioned axially along a radial center of the nozzle body, the nozzle body having a side facing in a direction in which lubricant is to be sprayed;
    providing a first spray nozzle being movably located on the nozzle body while being maintained and fixed in an orientation parallel to a second axis, the second axis being spaced from and parallel to the first axis, motion of the first spray nozzle about the second axis not resulting in the first spray nozzle being aligned askew with the second axis, providing a second spray nozzle located on the nozzle body and fixed in an orientation parallel to the first axis such that the second spray nozzle cannot be positioned askew relative to the first axis, the first spray nozzle and the second spray nozzle both extending from the side of the nozzle body, wherein rotation of the first spray nozzle about the second axis results in a distance between a first outlet orifice of the first spray nozzle and a second outlet orifice of the second spray nozzle being adjusted.

13. The method of claim 12, further comprising adjusting the position of the first spray nozzle relative to the nozzle body to adapt the spacing between the first outlet orifice and the second outlet orifice as a function of a distance apart between zones to be lubricated.

14. The method of claim 13, securing the position of the first spray nozzle relative to the second spray nozzle after adjustment of the distance therebetween.

\* \* \* \* \*